(12) United States Patent
Kim et al.

(10) Patent No.: US 10,050,859 B2
(45) Date of Patent: Aug. 14, 2018

(54) APPARATUS FOR PROCESSING NETWORK PACKET USING SERVICE FUNCTION CHAINING AND METHOD FOR CONTROLLING THE SAME

(71) Applicant: FOUNDATION OF SOONGSIL UNIVERSITY INDUSTRY COOPERATION, Seoul (KR)

(72) Inventors: Young Han Kim, Seoul (KR); Doan Van Tung, Seoul (KR); Do Truong Xuan, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 165 days.

(21) Appl. No.: 15/169,321

(22) Filed: May 31, 2016

(65) Prior Publication Data

US 2017/0288998 A1 Oct. 5, 2017

(30) Foreign Application Priority Data

Apr. 4, 2016 (KR) .......................... 10-2016-0041167

(51) Int. Cl.
  *G06F 15/173* (2006.01)
  *H04L 12/26* (2006.01)
  *H04L 12/24* (2006.01)

(52) U.S. Cl.
  CPC ...... *H04L 43/0823* (2013.01); *H04L 41/0654* (2013.01); *H04L 43/50* (2013.01); *H04L 41/0681* (2013.01)

(58) Field of Classification Search
  CPC . H04L 43/0823; H04L 43/50; H04L 41/0654; H04L 41/0681
  USPC .......................................................... 709/224
  See application file for complete search history.

(56) References Cited

U.S. PATENT DOCUMENTS

| 9,354,776 | B1 * | 5/2016 | Subramanian ...... G06F 3/04817 |
| 2007/0130208 | A1 * | 6/2007 | Bornhoevd ............. G06F 9/485 |
| 2010/0281166 | A1 * | 11/2010 | Buyya ................... G06F 9/5072 709/226 |
| 2012/0324069 | A1 * | 12/2012 | Nori ...................... G06F 9/5066 709/222 |
| 2017/0180234 | A1 * | 6/2017 | Agrawal ............. H04L 63/1458 |

\* cited by examiner

*Primary Examiner* — Kristie Shingles
(74) *Attorney, Agent, or Firm* — Hauptman Ham, LLP

(57) ABSTRACT

A network packet processing apparatus using a service function chaining and a method of controlling the same are provided. The network packet processing apparatus includes a plurality of service function modules configuring the service function chaining, each of the plurality of service function modules being one of a stateful service function module and a stateless service function module. Also the network packet processing apparatus includes an input logger and an output logger used to perform fault-recovery, and a service function forwarder module forwarding a packet to the plurality of service function modules, the input logger, and the output logger through a path specified in the packet.

10 Claims, 6 Drawing Sheets ary pages

APPARATUS FOR PROCESSING NETWORK PACKET USING SERVICE FUNCTION CHAINING AND METHOD FOR CONTROLLING THE SAME

CROSS-REFERENCE TO RELATED APPLICATION(S)

This application claims benefit of priority to Korean Patent Application No. 10-2016-0041167 filed on Apr. 4, 2016 in the Korean Intellectual Property Office, the disclosure of which is incorporated herein by reference in its entirety.

BACKGROUND

1. Field

The present invention relates to a network packet processing apparatus capable of providing an efficient fault-recovery function in an environment using a service function chaining (SFC) and a method of controlling the same.

2. Description of Related Art

Network Functions Virtualization (NFV) systems are technologies for controlling and managing virtual network functions in software. In particular, a service function chaining technology in which virtual network functions are sequenced, connected, and executed is increased in attention to the SFC technology, the next issue of the research into NFV, is being increased in that it allows for customization and automation of key network services. The SFC technology is being developed under the model name of the development of VNF forwarding graph in ETSI NFV ISG, and a standardization progress for the detailed function structure and protocols therefor is being made in the IETF SFC WG.

Service function chaining may dynamically generate a new service function (SF) in a virtualized environment by a network operator. The service function chaining may be used to reduce complexity in setting of the service functions. The service function chaining is an ordered set of service functions, and the service function is classified as a stateful SF and a stateless SF. Here, the stateful SF means SF only capable of being performed with only pieces of status information, while the stateless SF means the SF which is capable of being performed without status information.

Fault recovery mechanisms for service functions according to the related art have different characteristics. When applying these mechanisms to both the stateful SF and the stateless SF in a building network, a large amount of resources may be wasted, and therefore, there have been disadvantage that networks are managed inefficiently.

SUMMARY

An aspect of the present invention is to provide a network packet processing apparatus in which an efficient fault-recovery function may be provided in an environment using service function chaining (SFC) and a method of controlling the same.

According to an aspect of the present invention, a network packet processing apparatus using a service function chaining, may include a plurality of service function modules configuring the service function chaining, each of the plurality of service function modules being one of a stateful service function module and a stateless service function module; an input logger and an output logger used to perform fault-recovery for the stateful service function module of the plurality of service function modules; and a service function forwarder module forwarding the packet to the plurality of service function modules, the input logger, and the output logger through a path specified in the packet.

When a service function module A of the plurality of service function modules is the stateful service function module, the service function forwarder module may forward the packet to the input logger, the service function module A, and the output logger, sequentially, when a service function module B of the plurality of service function modules is the stateless service function module, the service function forwarder module only may forward the packet to the service function module B.

The input logger may store the packet forwarded from the service function forwarder module, and then may transmit the packet to the service function forwarder module, the service function module A may process the packet forwarded from the service function forwarder module, may generate a packet access log (PAL) with regard to the packet, and may transmit the packet and the packet access log to the service function forwarder module, the service function forwarder module may transmit the packet and the packet access log to the output logger, and the output logger may transmit the packet access log to a backup service function module in the service function module A.

When a fault occurs in the service function module A, the input logger may transmit the stored packet to the service function forwarder module, the service function forwarder module may transmit the stored packet to the backup service function module, and the backup service function module may replaces the service function module A in which the fault has occurred, on the basis of the stored packet and the packet access log.

The service function forwarder module may include a forwarding table storing identification information of the plurality of service function modules, identification information of the input logger, and identification information of the output logger, and the service function forwarder module forwards the packet on the basis of the forwarding table.

When the fault occurs in the service function module A, the identification information of the service function module A in the forwarding table may be changed to the identification information of the backup service function module.

The network packet processing apparatus further may include a backup input logger for the input logger and a backup output logger for the output logger, and when a fault occurs in the input logger or the output logger, the service function forwarder module changes identification information of the input logger to identification information of the backup input logger in the forwarding table, or the identification information of the output logger to the identification information of the backup output logger in the forwarding table.

The packet may include a network service header (NSH), and the network service header includes a connection identifier field indicating a forwarded sequence of the packet to the input logger, the service function module A, and the output logger.

The connection identifier field has a field value of 2 bits, the field value of the 2 bits being set to "00" initially, when the input logger receives the packet from the service function forwarder module, the input logger changes the field value to "01", and the service function forwarder module transmits the packet to the service function module A based on the field value of the connection identifier field, when the service function module A receives the packet, the service function module A changes the field value to "10", and the service function forwarder module transmits the packet to the output logger based on the field value of the connection identifier field, and when the output logger receives the packet, the output logger changes the field value of the connection identifier field to "00".

According to an aspect of the present invention, a method of controlling a network packet processing apparatus using a service function chaining, the network packet processing apparatus including a plurality of service function modules, an input logger, an output logger, and a service function forwarder module, the method includes transmitting a packet to the input logger, by the service function forwarder module; transmitting the packet to the service function forwarder module after storing the packet, by the input logger; transmitting, by the service function forwarder module, the packet to a service function module A, a stateful service function module of the plurality of service function modules; processing the packet, generating a packet access log (PAL) with respect to the packet, and transmitting the packet and the packet access log to the service function forwarder module, by the service function module A; transmitting the packet and the packet access log to the output logger, by the service function forwarder module; and transmitting the packet access log to a backup service function module of the service function module A, by the output logger.

BRIEF DESCRIPTION OF DRAWINGS

The above and other aspects, features, and advantages of the subject matter disclosed herein will be described with reference to exemplary embodiments illustrated in the figures, in which.

DETAILED DESCRIPTION

The singular forms "a", "an" and "the" used in the context of describing the present invention are intended to include the plural forms as well, unless otherwise noted. The terms "comprising", "having", "including", and "containing" are to be construed as open-ended terms (i.e., meaning "including, but not limited to,") unless otherwise noted, and therefore, the terms do not preclude the presence or addition of one or more other elements, components, steps, and/or groups thereof. Also, the term "part" or "module", as used herein, means a unit that processes at least one function or operation, which can be implemented in hardware or software, or implemented as a combination of hardware and software.

Hereinafter, various embodiments of the present invention will be described with reference to the accompanying drawings.

Figure 1:
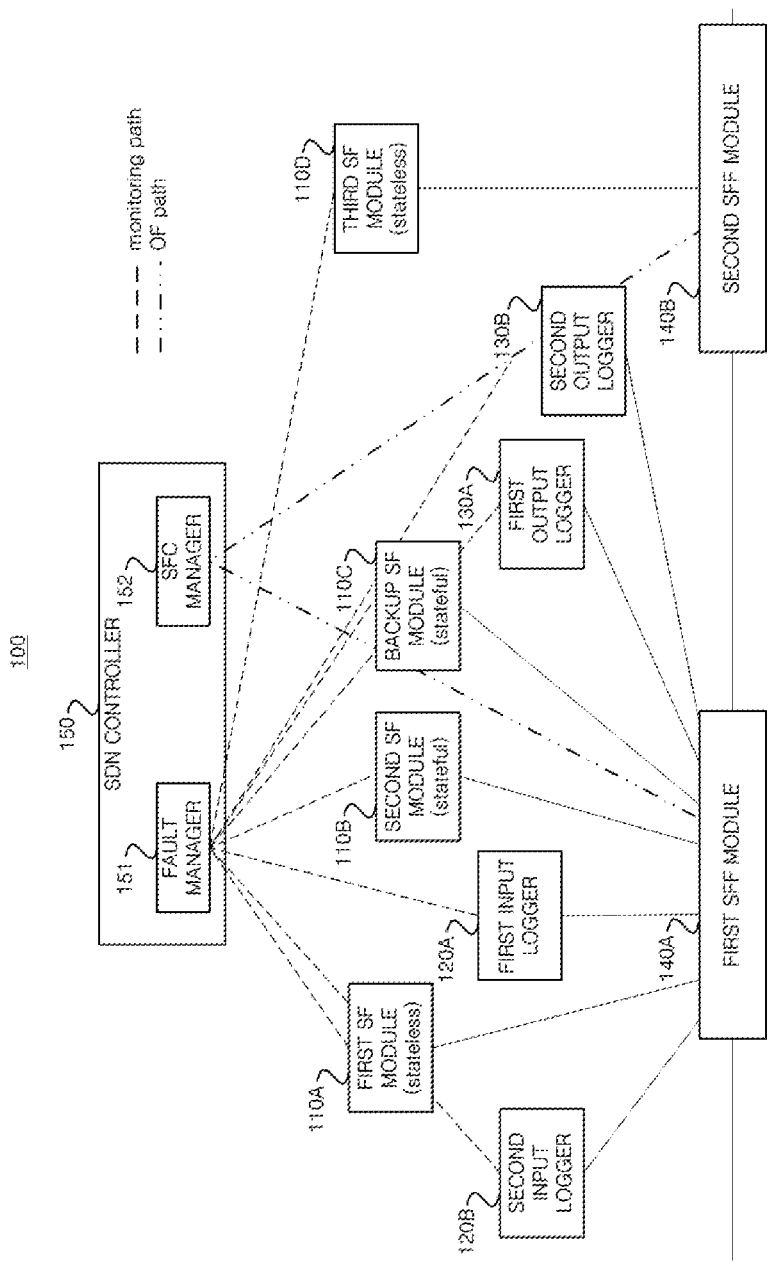
FIG. 1 is a schematic diagram illustrating a configuration of a network packet processing apparatus according to an embodiment of the present invention.

FIG. 1 is a schematic diagram illustrating a configuration of a network packet processing apparatus according to an embodiment of the present invention.

Referring to FIG. 1, a network packet processing apparatus 100 according to an embodiment of the present invention includes a plurality of service function (SF) modules 110, at least one input logger 120, at least one output logger 130, a service function forwarder (SFF) module 140, and a software defined networking (SDN) controller 150.

Hereinafter, the features of respective components will be described in detail with reference to FIG. 1.

The plurality of SF modules 110 configure service function chaining (SFC), and perform specific processing for a network packet.

Here, each of the plurality of SF modules 110 may be one of a stateful SF module and a stateless SF module. The stateful SF module means an SF module using pieces of status information to provide a service. The stateless SF module means an SF module that provides a service only depending on a request newly received from a client without status information.

In this case, the status information indicates a result of operations (data transmitting/receiving and processing) in the past history. When the SF module is operated using the status information, a quickly respond to an agreed command according to the current state may be performed, and a size of a message to be exchanged with the client may be reduced.

In addition, the plurality of SF modules 110 include at least one master SF module and at least one backup SF module. The master SF module processes a packet (traffic), and generates a packet access log (PAL). The backup SF module receives the packet and the PAL from the master SF module as described below, ad in a case in which a fault occurs in the master SF module, the backup SF module processes the packet of the master SF module by using the packet and the PAL.

The input logger 120 and the output logger 130 are used to perform fault-recovery for the stateful SF module of the SF modules. The SFF module 140 performs a function of forwarding the packet to the plurality of service function modules 110, the input logger 120, and the output logger 130 through a path specified in the packet.

In case that a SF module A of the plurality of service function modules 110 is the stateful SF module, the SFF module 140 may forward the packet to the input logger 120, the SF module A, and the output logger 130, sequentially. In addition, when a SF module B of the plurality of SF modules 110 is the stateless SF module, the SFF module 140 only forwards the packet to the SF module B. In detail, in case that the SF module B is the stateless SF module, the packet is not forwarded to the input logger 120 and the output logger 130. In other words, embodiments of the present invention may be applied to a case in which a fault occurs in the master SF module, the stateful SF module.

According to an embodiment of the invention, in a case in which a fault occurs in the SF module A, the input logger 120 transmits a stored packet to the SFF module 140, and the SFF module 140 transmits the stored packet to the backup SF module. In this case, the backup SF module may replace the defective SF module A on the basis of the stored packet and the packet access log as described below.

The SDN controller 150 includes a fault manager 151 and a SFC manager 152. The fault manager 151 detects a fault with respect to the plurality of SF modules 110, and forwards the fault detection result to the SFC manager 152. Since the SFC manager 152 has a blue picture for network topology, the SFC manager 152 may generate a service function chaining by using the fault detection result.

At this time, the SFC manager 152 has to extend functionality thereof to be able to have information about the input logger 120 and the output logger 130. In addition, the SFC manager 152 retains information about the types (stateful, stateless) of the SF modules, and receives status information of the input logger 120 and the output logger 130 and information about the type of the SF module from the fault manager 151. Using this information, the SFC manager 151 reconstructs a forwarding table present in the SFF module 140 to provide a service of the service function chaining.

On the other hand, the input logger 120, the output logger 130, and the SFF module 140 will be described in more detail as below.

The input logger 120 stores or buffers the packet received from the SFF module 140 in a memory, and forwards the stored or buffered packet to the SFF module 140. For example, if there is a fault in the master SF module in an environment in which a service is provided, a plurality of packets to be forwarded to the master SF module are dropped. The master SF module transmits the packet using an end point protocol (for example, TCP) in worst case, but a fault occurs in the master SF module, the master SF module proceeds with a time-out or reset mode so as to continue the connection. In this case, there is a disadvantage in that a fault-recovery mechanism becomes inefficient. Thus, the input logger 120 stores copied packets to perform rapid fault-recovery, and transmits the copied packets to the backup SF module in a case in which a fault occurs in the master SF module later.

In addition, the SFF module 140 receives the packet and the packet access log (PAL) from the master SF module, and transmits the received packet and packet access log (PAL) to the output logger 130. The output logger 130 transmits the packet access log to the backup SF module, and may transmit the packet to other SFF modules.

Specifically, the network packet processing apparatus, operates in non-determinism, which is a common feature represented in parallel processing. For example, in case that a plurality of threads are commonly used, although the network packet processing apparatus may access the status information, it may be relatively difficult to control an access order of the threads. By the non-determinism characteristics, in a case in which a fault occurs in the master SF module, there may be a difficulty in performing an exact operation matched to the same packet by the backup SF module. Therefore, in order to solve this problem, the master SF module generates a packet access log having information about a non-determinism event. The generated packet access log is transmitted to the output logger 130, and the output logger 130 transfers the received packet access log to the backup SF module.

The SFF module 140 serves to forward the packet to the plurality of the SF modules through the transmission path of the packets specified through the encapsulation. Further, the SFF module 140 includes a forwarding table, and according to an embodiment of the present invention, the forwarding table is extended to include identification information of the input logger 120 and identification information of the output logger 130. Also the SFF module 140 recognizes the type (stateful, stateless) information about the SF module received from the SFC manager 152, and performs controlling to reduce the numbers of the input loggers 120 and the output loggers 130 and the number of packets stored in memories thereof.

Figure 2:
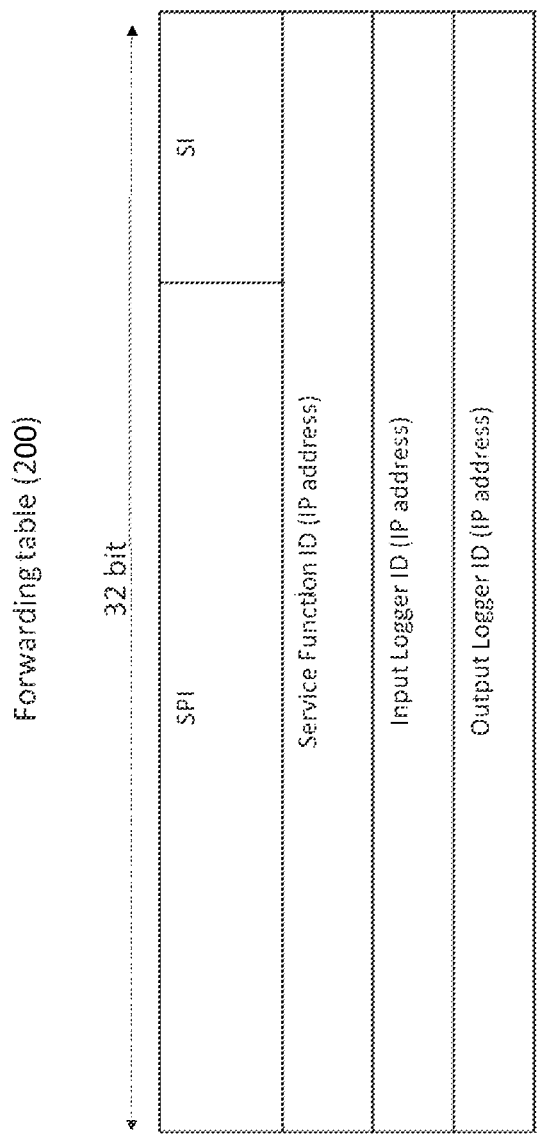
FIG. 2 is a diagram illustrating a structure of forwarding table according to an embodiment of the present invention.

FIG. 2 is a diagram showing a structure of a forwarding table according to an embodiment of the present invention.

As mentioned above, the forwarding table 200 is used to forward the packets. The forwarding table 200 includes an SPI 210 storing service path IDs, an SI 220 storing a service index, and a service function IP (IP address) 230 storing identification information with respect to the plurality of SF modules 110. In addition, the forwarding table 200 further includes an input logger ID (IP address) 240 which is identification information of the input logger 120 newly added, and an output logger ID (IP address) 250 which is identification information of the output logger 130 newly added.

Since the identification information of the plurality of SF modules 110, the SPI 210, and the SI 220 is existing field information included in the forwarding table 200, a detailed description thereof is omitted below.

In case that the packet is forwarded to the next SF module, the input logger ID (IP address) 240 and the output logger (IP address) 250 may determine whether to be forwarded through the input logger 120 and the output log 130, and determine the identification information of the input logger 120 and the output log 130 in the case that the packet is forwarded through the input logger 120 and the output logger 130. Also, as will be described in the following, if a fault occurs in the input logger 120 and the output log 130, the status information with respect to other input loggers and other output loggers may be stored by changing information of the forwarding table 200.

On the other hand, if a fault occurs in the SF module A, the SDN controller 150 transmits a new forwarding table to the SFF module 140. Accordingly, the identification information of the SF module A in the forwarding table is changed to the identification information of the backup SF module. This will be described in more detail below.

Figure 3:
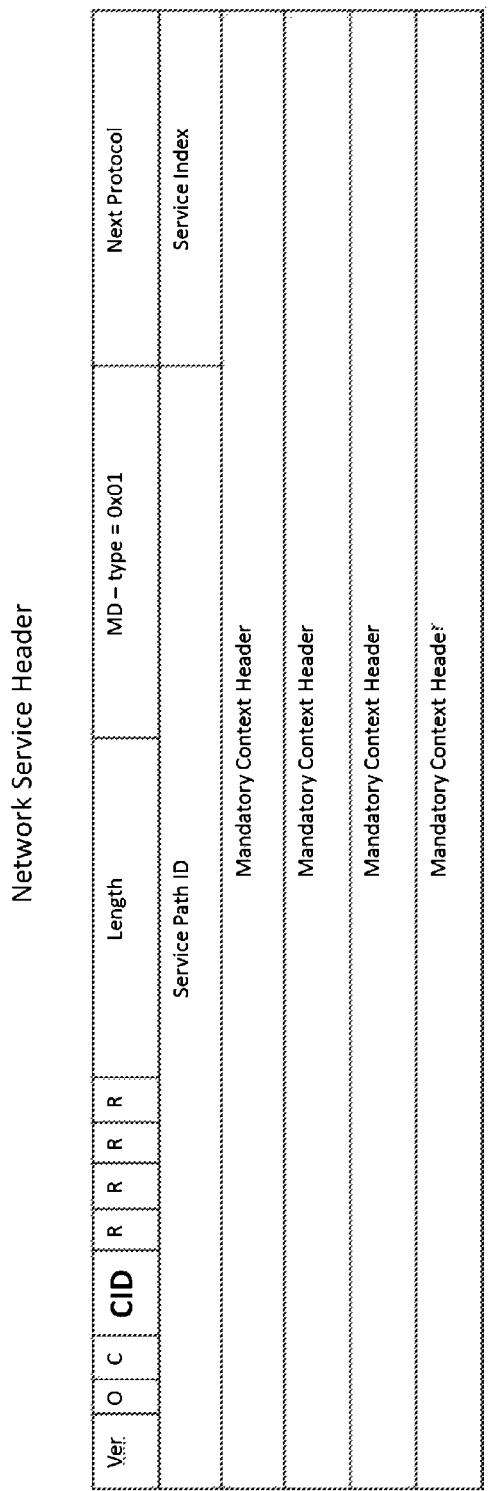
FIG. 3 is a diagram illustrating a configuration of a network service header (NSH) in an encapsulated packet according to an embodiment of the present invention.

FIG. 3 is a diagram illustrating a configuration of a network service header (NSH) in an encapsulated packet according to an embodiment of the present invention.

The NSH includes information of the service function paths. In detail, according to an embodiment of the present invention, the forward order of the packets may be indicated by using 2 bits (CID, Connection ID) of reserved 6 bits in the NSH. In detail, the NSH includes a connection identifier field indicating a forwarded sequence of the packets transferred to the input logger, the SF module A, and the output logger.

According to an example of the present invention, in the case of one example, an initial field value about the connection identifier field (CID) may be set to "00", and "01" may mean that the next destination is the SF module A (stateful SF module). "10" may mean that the next destination is the output logger 130. In detail, in case that the SFF module 140 receives the packet, the SFF module 140 forwards the packet to the input logger 120 by using the identification information (InputLogger ID) 230 of the input logger 120. The input logger 120 sets the connection identifier field (CID) to "01" to inform that the next destination is the SF module A (stateful SF module). Similarly, the SF module A sets the connection identifier field (CID) to "10" to inform that the next destination is the output logger 130.

In detail, when the input logger 120 receives the packet from the SFF module 140, the input logger 120 changes the field value of the CID from "00" to "01", and the SFF module 140 transmits the packet to the SF module A based on the field value of the connection identifier field. Also, when the SF module A receives the packet, the SF module A changes the field value of the CID from "01" to "10", and the SFF module 140 transmits the packet to the output logger 130 based on the field value of the connection identifier field (CID). Further, when the output logger 130 receives the packet, the output logger 130 changes the field value of the connection identifier field (CID) from "10" to "00".

Figure 4:
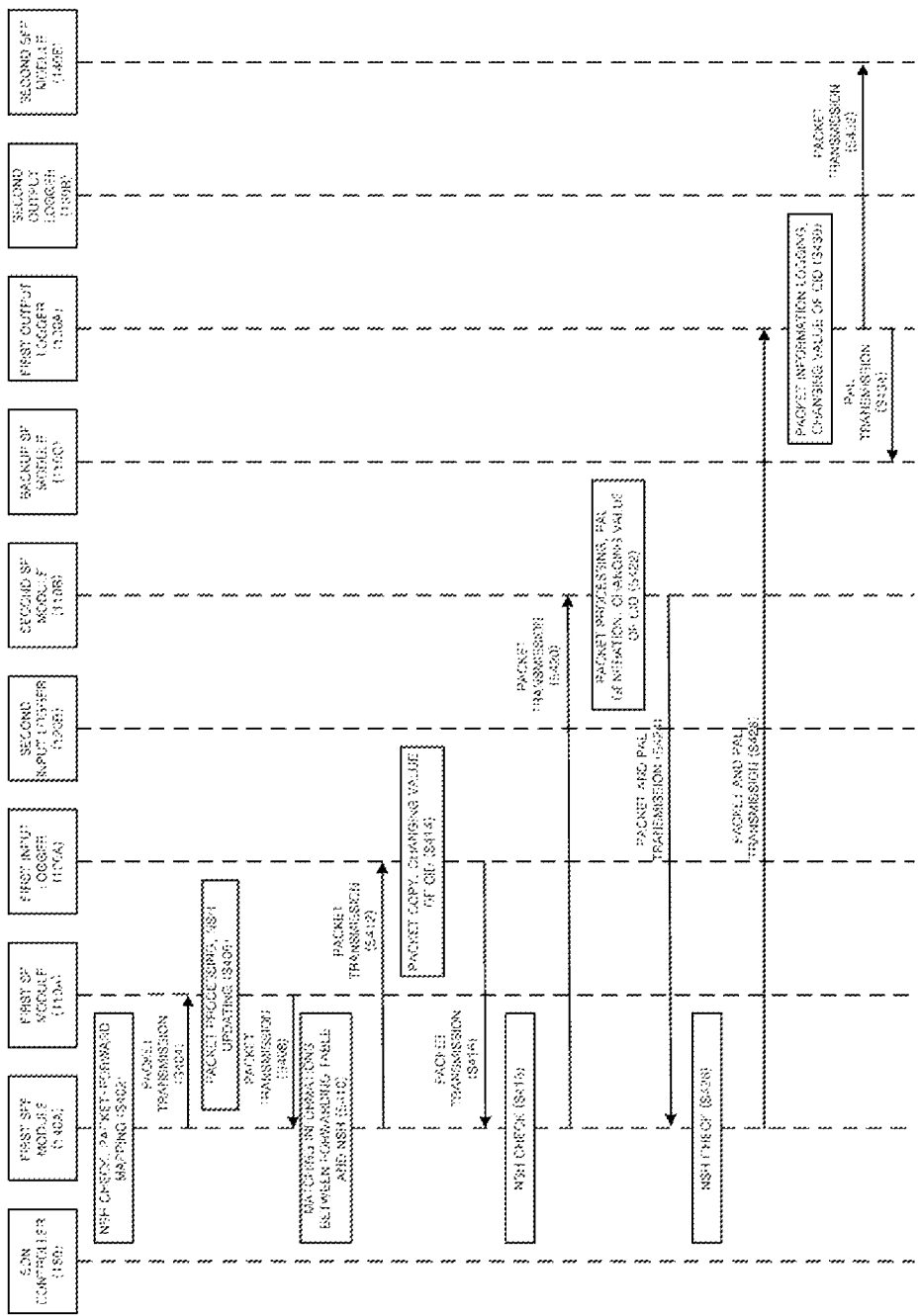
FIG. 4 is a diagram illustrating a flow of an SFC service process according to an embodiment of the present invention.

FIG. 4 is a diagram illustrating a flow of an SFC service process according to an embodiment of the present invention.

Here, a case in which when the SFC is configured of two SFs, a first SF is performed as the stateless SF in the first SF module 110A, and a second SF is performed as the stateful SF in the second SF module 110B may be provided by way of example.

First, in operation S402, a first SFF module 140A receives a packet, determines a SPI in the NSH, and performs a mapping between the packet and the forwarding table 200. In this case, the mapping is performed to determine whether the received SF module is the stateful SF module or the stateless SF module. Here, because there is no information of the InputLogger ID and the OutputLogger ID in the forwarding table 200, the packet is forwarded directly to the first SF module 110A, without passing through the input logger 120 (S404).

Next, the first SF module 110A processes the received packet and then updates the NSH (SI decrease) (S406). Accordingly, the packet is transmitted to the first SFF module 140A (S408).

Subsequently, the first SFF module 140A receives the packet and then checks the NSH to match the information (SPI, SI) of the forwarding table 200 and the information (SPI, SI) of the NSH (S410). Through this, the first input logger 120A and the first output logger 130A may be searched.

Then, the first SFF module 140A transmits the packet to the first input logger 120A which is matched to the forwarding table 200 (S412). The first input logger 120A copies the packet in a buffer and changes the value of the connection identifier field (CID) in the NSH from "00" to "01" (S414), and transmits the packet to the first SFF module 140A (S416).

The first SFF module 140A receives the packet and then checks the information (CID 01, SPI, SI) of the NSH. The first SFF module 140A transmits the packet to the second SF module 110B based on the checked information (S420). The second SF module 110B which is the stateful SF module processes the packet as well as generates the PAL which is process state information. The second SF module 110B changes the value of the connection identifier field (CID) from "01" to "10" (S422), and transmits the packet and the PAL to the first SFF module 140A (S424). The first SFF module 140A checks the information (CID 10, SPI, SI) of the NSH (S426), and transmits the packet and the PAL to the first output logger 130A based on the checked information (S428).

The first output logger 130A receives the packet and the PAL, and then checks whether the packet related information is all logging, and changes the value of the connection identifier field (CID) of the NSH from "10" to "00" (S430). Then, the first output logger 130A transmits the packets to the second SFF module 140B (S432), and transmits the PAL to the backup SF module 110C of the second SF module 110B (S434).

In summary, the operations of FIG. 4 (that is, a method of controlling a network packet processing apparatus) may include transmitting a packet to the first input logger 120A, by the first SFF module 140A. And the method may include transmitting the packet to the first SFF module 140A after storing the packet, by the first input logger 120A; transmitting, by the first SFF module 140A, the packet to the second SF module 110B that is the stateful SF module; processing the packet, generating the packet access log (PAL), and transmitting the packet and the packet access log to the first SFF module 140A, by the second SF module 110B; transmitting the packet and the packet access log to the first output logger 130A, by the first SFF module 140A; and transmitting the packet access log to the backup SF module 110C, by the first output logger 130A.

Figure 5:
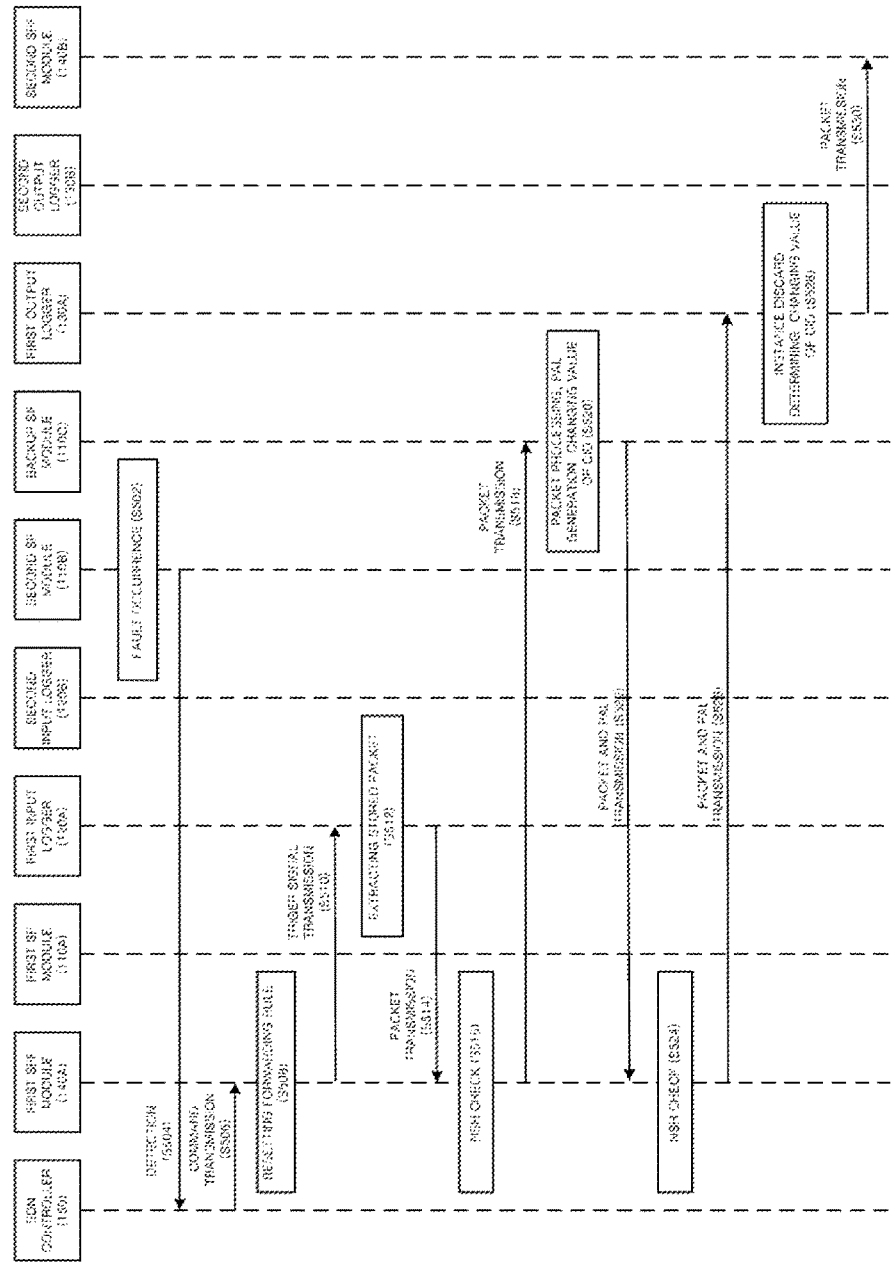
FIG. 5 is a diagram illustrating a flow of a fault-recovery process in case that a fault occurs in SF module A (stateful SF module) according to an embodiment of the present invention.

FIG. 5 is a diagram illustrating a flow of a fault-recovery process in case that a fault occurs in SF module A (stateful SF module) according to an embodiment of the present invention. Here, the processes of FIG. 5 may be preformed after the processes of FIG. 4 are preformed.

First, in operation S502, when a fault occurs in the second SF module 110B being the stateful SF module, a SDN controller 150 detects the fault regarding the second SF module 110B (S504). After this, SDN controller 150 makes a decision regarding policy on the basis of the detected fault, and then transmits a command to the first SFF module 140A (S506). The first SFF module 140A resets forwarding rules in accordance with the command (S508). Thus, IP address of the second SF module 110B as the master SF module in the forwarding table 200 is changed to IP address of the backup SF module 110C. However, IP addresses of the first input logger 110A and the second output logger 110B are not changed.

Next, the SDN controller 150 transmits a trigger signal to the first input logger 110A (S510). The first input logger 110A extracts the stored packets (including status information) (S512), and then transmits the packets to the first SFF module 140A (S514).

The first SFF module 140A receives the packet, checks the information (CID 01, SPI, SI) of the NSH, and then transmits the packet to the backup SF module 110C according to the checked information (S518). As the backup SF module 110C is too the stateful SF module, the backup SF module 110C processes the packet, generates the PAL, and changes the connection identifier field (CID) from "01" to "10" (S520). And, the backup SF module 110C transmits the packet and the PAL to the first SFF module 140A (S522). The first SFF module 140A checks the information of the NSH (CID 10, SPI, SI) (S524), and transmits the packet to the first output logger 130A based thereon (S526).

The first output logger 130A receives the packet, checks whether a previous instance has already been released and is discarded, and then changes the connection identifier field (CID) of the NSH from "10" to "00" (S528), and the first output logger 130A transmits the packet to the second SFF module 140B (S530).

In summary, the operations of FIG. 5 (that is, a method of controlling a network packet processing apparatus) may includes transmitting the stored packet to the first SFF module 140A, by the first input logger 120A when the fault occurs in the second SF module 110B; and transmitting the stored packet to the backup SF module 110C, by the first SFF module 140A. In this case, the backup SF module 110C may replace the second SF module 110B on the basis of the stored packet and the packet access log.

Figure 6:
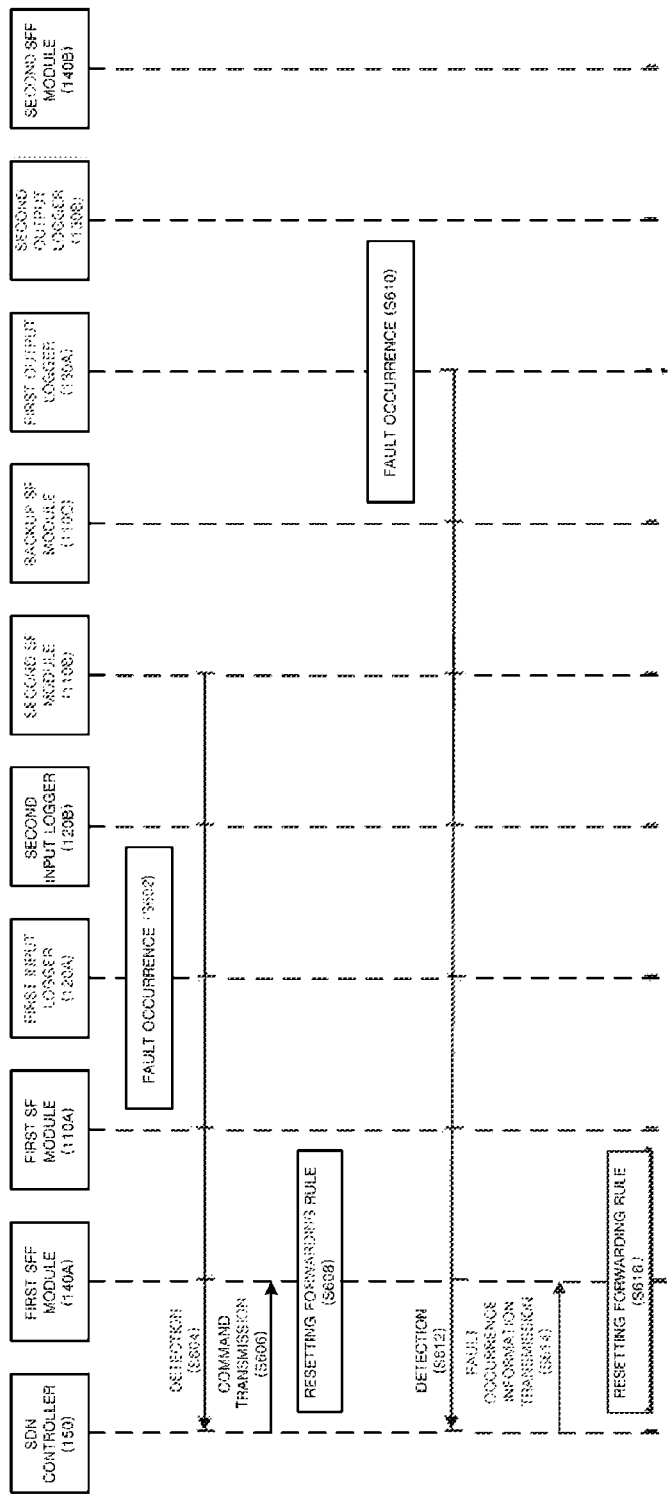
FIG. 6 is a diagram illustrating a flow of a fault-recovery process in case that a fault occurs in an input logger or an output logger according to an embodiment of the present invention.

FIG. 6 is a diagram illustrating a flow of a fault-recovery process in case that a fault occurs in an input logger or an output logger according to an embodiment of the present invention. Here, the processes of FIG. 6 may be preformed after the processes of FIG. 4 are preformed.

First, in operation S602, when a fault occurs in the first input logger 120A, a SDN controller 150 detects the fault regarding the first input logger 120A (S604). After this, SDN controller 150 makes a decision regarding policy on the basis of the detected fault, and then transmits a command to the first SFF module 140A (S606). The first SFF module 140A resets forwarding rules in accordance with the command (S608). Thus, IP address of the first input logger 120A in the forwarding table 200 is changed to IP address of the second input logger 120B.

Similarly, if a fault occurs in the first output logger 130A (S610), the SDN controller 150 detects the fault regarding the first output logger 130A (S612). Thereafter, the SDN controller 150 transmits the fault information of the first output logger 130A to the first SFF module 140A (S614). The first SFF module 140A resets the forwarding rule (S616). Thus, IP address of the first output logger 130A in the forwarding table 200 is changed to IP address of the second output logger 130B.

In summary, when a fault occurs in the input logger 120A or the output logger 130B, the SFF module 140 may change the identification information of the input logger 120A to the identification information of the backup input logger 120B in the forwarding table 200, or the identification information of the output logger 130A to the identification information of the backup output logger 130B in the forwarding table 200.

As set forth above, according to the present invention, an efficient fault-recovery function is provided in an environment using service function chaining (SFC).

In addition, the technical contents described above may be recorded on computer readable media by being implemented in the form of a program instruction that may be executed by various computer means. The computer readable media may also include, program instructions, data files, data structures, and the like alone or in combination with each other. The program instructions recorded on the computer readable media may be specifically designed and configured to implement embodiments, or may be available for use in the field of computer software. Examples of the computer readable recording media may include magnetic media such as hard disks, floppy disks, and magnetic tapes, optical media such as CD-ROMs and DVDs, magneto-optical media such as a floptical disk, and hardware devices such as ROM (ROM), random access memory (RAM), and a flash memory. The hardware devices may be specially configured to store and perform program instructions. Examples of program instructions include not only a machine code such as being produced by a compiler but also a higher level code that may be executed by a computer using an interpreter. The hardware devices may be configured to act as one or more software modules so as to perform the operations in the embodiments, or vice versa.

While the present invention as described above has been described with reference to particular details such as specific components and example embodiments and drawings, which merely provided to assist a thorough understanding of the present invention, the present invention is not limited to the examples described above. It will be apparent to those skilled in the art to which the invention pertains that various changes and modifications may be made thereto the described embodiments. Therefore, it should be understood that the scope of the present invention is not limited to the examples described above. It is, therefore, to be understood that the appended claims are intended to cover all such modifications and changes as fall within the scope of the embodiments.

What is claimed is:

1. A network packet processing apparatus using a service function chaining, comprising:
   a plurality of service function modules configuring the service function chaining;
   an input logger and an output logger configured to perform fault-recovery for a stateful service function module of the plurality of service function modules, wherein the stateful service function module is a service function module using status information to provide a service; and
   a service function forwarder module configured to forward a packet to the plurality of service function modules, the input logger, and the output logger through a path specified in the packet,
   wherein, when a service function module A of the plurality of service function modules is the stateful service function module,
      the service function forwarder module forwards the packet to the input logger, the service function module A, and the output logger, sequentially,
      the input logger stores the packet forwarded from the service function forwarder module, and transmits the packet to the service function forwarder module,
      the service function module A processes the packet forwarded from the service function forwarder module, generates a packet access log (PAL) having information about a non-determinism event with regard to the packet, and transmits the packet and the PAL to the service function forwarder module,
      the output logger receives the packet and the PAL from the service function forwarder module, and transmits the PAL to a backup service function module of the service function module A, and
      when a fault occurs in the service function module A, the input logger transmits the stored packet to the service function forwarder module, the service function forwarder module transmits the stored packet to the backup service function module, and the backup service function module replaces the service function module A on the basis of the stored packet and the PAL.

2. The network packet processing apparatus of claim 1, wherein
   when a service function module B of the plurality of service function modules is a stateless service function module, the service function forwarder module only forwards the packet to the service function module B, wherein the stateless service function module is a service function module that does not use the status information to provide a service.

3. The network packet processing apparatus of claim 1, wherein
   the service function forwarder module comprises a forwarding table storing identification information of the plurality of service function modules, identification information of the input logger, and identification information of the output logger; and
   the service function forwarder module forwards the packet on the basis of the forwarding table.

4. The network packet processing apparatus of claim 3, wherein when the fault occurs in the service function module A, the identification information of the service function module A in the forwarding table is changed to the identification information of the backup service function module.

5. The network packet processing apparatus of claim 3, further comprising
a backup input logger for the input logger and a backup output logger for the output logger,
wherein when a fault occurs in the input logger or the output logger, the service function forwarder module changes the identification information of the input logger to identification information of the backup input logger in the forwarding table, or the identification information of the output logger to identification information of the backup output logger in the forwarding table.

6. The network packet processing apparatus of claim 1, wherein
the packet comprises a network service header (NSH), and
the network service header includes a connection identifier field indicating a forwarded sequence of the packet to the input logger, the service function module A, and the output logger.

7. The network packet processing apparatus of claim 6, wherein:
the connection identifier field has a field value of 2 bits, the field value of the 2 bits being set to "00" initially;
when the input logger receives the packet from the service function forwarder module, the input logger changes the field value to "01", and the service function forwarder module transmits the packet to the service function module A based on the field value of the connection identifier field;
when the service function module A receives the packet, the service function module A changes the field value to "10", and the service function forwarder module transmits the packet to the output logger based on the field value of the connection identifier field; and
when the output logger receives the packet, the output logger changes the field value of the connection identifier field to "00".

8. A method of controlling a network packet processing apparatus using a service function chaining, the network packet processing apparatus including a plurality of service function modules, an input logger, an output logger, and a service function forwarder module, the method comprising:
transmitting a packet to the input logger, by the service function forwarder module;
storing the packet and transmitting the packet to the service function forwarder module, by the input logger;
transmitting the packet to a service function module A of the plurality of service function modules, by the service function forwarder module, wherein the service function module A is a stateful service function module which uses status information to provide a service;
processing the packet, generating a packet access log (PAL) having information about a non-determinism event with respect to the packet, and transmitting the packet and the PAL to the service function forwarder module, by the service function module A;
transmitting the packet and the PAL to the output logger, by the service function forwarder module;
transmitting the PAL to a backup service function module of the service function module A, by the output logger;
transmitting the stored packet to the service function forwarder module, by the input logger, when a fault occurs in the service function module A, and
transmitting the stored packet to the backup service function module, by the service function forwarder module,
wherein the backup service function module replaces the service function module A on the basis of the stored packet and the PAL.

9. The method of claim 8, wherein the service function forwarder module comprises a forwarding table storing identification information of the plurality of service function modules, identification information of the input logger, and identification information of the output logger.

10. The method of claim 8, wherein
the packet comprises a network service header (NSH), and
the network service header includes a connection identifier field indicating a forwarded sequence of the packet transferred to the input logger, the service function module A, and the output logger.

* * * * *